United States Patent
Elliott et al.

(10) Patent No.: US 11,442,767 B2
(45) Date of Patent: Sep. 13, 2022

(54) VIRTUAL SERIAL PORTS FOR VIRTUAL MACHINES

(71) Applicant: HEWLETT PACKARD ENTERPRISE DEVELOPMENT LP, Houston, TX (US)

(72) Inventors: Robert C. Elliott, Houston, TX (US); Theodore F. Emerson, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 304 days.

(21) Appl. No.: 16/803,293

(22) Filed: Feb. 27, 2020

(65) Prior Publication Data
US 2021/0271500 A1 Sep. 2, 2021

(51) Int. Cl.
| G06F 9/455 | (2018.01) |
| G06F 9/30 | (2018.01) |
| G06F 9/54 | (2006.01) |
| G06F 13/42 | (2006.01) |
| G06F 1/3203 | (2019.01) |

(52) U.S. Cl.
CPC ........ *G06F 9/45558* (2013.01); *G06F 1/3203* (2013.01); *G06F 9/30101* (2013.01); *G06F 9/544* (2013.01); *G06F 13/4282* (2013.01); *G06F 2009/45579* (2013.01); *G06F 2009/45583* (2013.01); *G06F 2009/45595* (2013.01)

(58) Field of Classification Search
USPC .......................................................... 718/1
See application file for complete search history.

(56) References Cited

U.S. PATENT DOCUMENTS

| 8,074,262 | B2 | 12/2011 | Scarlata |
| 8,239,667 | B2 | 8/2012 | Durham |
| 8,645,605 | B2 | 2/2014 | Subramaniyan et al. |
| 8,694,991 | B2 * | 4/2014 | Bonola ..................... G06F 8/61 718/1 |
| 8,892,802 | B2 | 11/2014 | Amit et al. |
| 8,954,965 | B2 | 2/2015 | Novak et al. |
| 9,600,313 | B2 | 3/2017 | Nimmagadda et al. |
| 9,990,220 | B2 | 6/2018 | Vavrick et al. |
| 10,268,500 | B2 | 4/2019 | Liguori et al. |
| 10,318,311 | B2 | 6/2019 | Liguori et al. |
| 10,382,195 | B2 | 8/2019 | Brandwine et al. |
| 10,860,523 | B2 * | 12/2020 | Panda ................... G06F 13/404 |
| 2009/0125901 | A1 * | 5/2009 | Swanson ............. G06F 9/45558 718/1 |

(Continued)

OTHER PUBLICATIONS

Dong et al., "High Performance Network Virtualization with SR-IOV", 2009, IEEE, pp. 1-10. (Year: 2009).*

(Continued)

*Primary Examiner* — Kenneth Tang
(74) *Attorney, Agent, or Firm* — Trop, Pruner & Hu, P.C.

(57) ABSTRACT

In some examples, a storage medium to stores information indicating address locations of virtual serial ports, where the virtual serial ports are associated with respective virtual machines (VMs). A controller that is separate from a hypervisor is to detect, based on the information, an access of a first virtual serial port associated with a first VM of the plurality of VMs, and communicate data between the first VM and another entity through the first virtual serial port.

20 Claims, 5 Drawing Sheets

(56) References Cited

U.S. PATENT DOCUMENTS

| | | | | |
|---|---|---|---|---|
| 2010/0306763 | A1* | 12/2010 | Lambert | G06F 9/45533 718/1 |
| 2011/0239213 | A1* | 9/2011 | Aswani | G06F 9/45558 718/1 |
| 2014/0359615 | A1* | 12/2014 | Chuang | G06F 9/45558 718/1 |
| 2016/0283425 | A1* | 9/2016 | Sarangdhar | G06F 13/362 |
| 2017/0177909 | A1* | 6/2017 | Sarangdhar | G06F 21/85 |
| 2018/0176036 | A1* | 6/2018 | Butcher | H04L 69/22 |

OTHER PUBLICATIONS 1 of 4—Unified EFI, Inc., Advanced Configuration and Power Interface Specification, Version 6.0, Apr. 2015 (pp. 1-219).
2 of 4—Unified EFI, Inc., Advanced Configuration and Power Interface Specification, Version 6.0, Apr. 2015 (pp. 220-481).
3 of 4—Unified EFI, Inc., Advanced Configuration and Power Interface Specification, Version 6.0, Apr. 2015 (pp. 482-744).
4 of 4—Unified EFI, Inc., Advanced Configuration and Power Interface Specification, Version 6.0, Apr. 2015 (pp. 745-1012).
Andre Richter et al., "Performance Isolation Exposure in Virtualized Platforms with PCI Passthrough I/o Sharing," 2014, pp. 1-12, Springer International Publishing, Switzerland.
Berger et al., vTPM: Virtualizing the Trusted Platform Module, USENIX Association, Security '06, 15th USENIX Security Symposium, 2006 (16 pages).
Felipe Huici et al., "Change: Enabling Innovation in the Internet Architecture Through Flexible Flow-processing Extensions," Apr. 23, 2014, pp. 1-72, Change Consortium.
George Crump, "Offloading I/O from the Hypervisor with Sr-IOV," Sep. 29, 2010, pp. 1-3, Retrieved from the Internet on Oct. 17, 2019 at URL: <storage-switzerland.com/Articles/Entries/2010/9/29_Offloading_I_0_from_the_Hypervisor_with_SR-IOV.html>.
HP, Technical White Paper, Implementing Windows Server 2012 SR-IOV (16 pages).
Intel, PCI-SIG Single Root I/O Virtualization (SR-IOV) Support in Intel® Virtualization Technology for Connectivity, White Paper, 2008 (4 pages).
Intel, PCI-SIG SR-IOV Primer, An Introduction to SR-IOV Technology, Intel® LAN Access Division, 321211-002, Revision 2.5, Jan. 2011 (28 pages).
Javier Echave, "Hyperflex Architecture and How It Works," Mar. 7, 2017, pp. 1-4, Retrieved from the Internet on Oct. 18, 2019 at URL: <gblogs.cisco.com/ch-tech/hyperflex-architecture-and-how-it-works/>.
Lenovo, A Technical Introduction to the Use of Trusted Platform Module 2.0 with Linux, Last Update: Sep. 8, 2017 (28 pages).
Marcus Sundberg and Erik Nilsson, "Emulation of TPM on Raspberry Pi," Master's Thesis, Mar. 19, 2015, pp. 1-77, Lund University, Sweden.
Microsoft Docs—Guarded fabric and shielded VMs overview, Aug. 28, 2018 (13 pages).
Microsoft Docs, Trusted Execution Environment ACPI Profile, Oct. 10, 2018 (33 pages).
Mike Foley, blogs.vmware.com, vSphere 6.7—Virtual Trusted Platform Modules, May 2, 2018 (14 pages).
PCI-SIG, PCI Code and ID Assignment Specification, Revision 1.11, Jan. 24, 2019 (25 pages).
Robert C. Elliott, U.S. Appl. No. 16/803,304 entitled System Reset Using a Controller filed Feb. 27, 2020 (32 pages).
Robert C. Elliott, U.S. Appl. No. 16/803,308 entitled Virtual Trusted Platform Modules filed Feb. 27, 2020 (30 pages).
Scott's Weblog, What is SR-IOV? Dec. 2, 2009 (5 pages).
Sourceforge, kagoldman, IBM's Software TPM 2.0 Last Update Apr. 10, 2019 (4 pages).
SR-IOV Virtual Functions (VFs), Windows drivers_Microsoft Docs, Apr. 19, 2017 (1 page).
TCG ACPI Specification, Family "1.2" and "2.0", Version 1.2, Revision 8, Aug. 18, 2017 (23 pages).
TCG PC Client Platform Firmware Profile Specification, Family "2.0", Level 00 Revision 1.04, Jun. 3, 2019 (123 pages).
Wikipedia, Single-root input/output virtualization last edited Sep. 26, 2019 (4 pages).
Zimmerman, Google Cloud, Identity & Security, Virtual Trusted Platform Module for Shielded VMs: security in plaintext, Aug. 6, 2018 (9 pages).
AWS, "Amazon Elastic Compute Cloud-User Guide for Linux Instances", 2020, 1212 pages.
Fedora Quick Docs, Virtualization: Creating Windows Virtual Machines using VirtIO Drivers, available online at <https://web.archive.org/web/20200219021842/https://docs.fedoraproject.org/en-US/quick-docs/creating-windows-virtual-machines-using-virtio-drivers/index.html>, Feb. 19, 2020, 6 pages.
Fedora WIKI, "Features/VirtioSerial", available online at <https://fedoraproject.org/w/index.php?title=Features/VirtioSerial&oldid=322039>, Feb. 4, 2013, 4 pages.
Google Clouds, "Interacting with the Serial Console", available online at <https://web.archive.org/veb/20191226161339/https://cloud.google.com/compute/docs/instances/interacting-with-serial-console>, Dec. 26, 2019, 11 pages.
KVM, "Guest API", available online at <https://web.archive.org/web/20191016053331/https://www.linux-kvm.org/page/Virtio-serial_API>, Linux Guest, Oct. 16, 2019, 2 pages.
Lardinois, Frederic, "Azure's new Serial Console gives you a direct window into the dark heart of your VMs", available online at <https://techcrunch.com/2018/03/26/azures-new-serial-console-gives-you-a-direct-window-into-the-dark-heart-of-your-vms/>, Mar. 26, 2018, 5 pages.
Microsoft Azure, "Azure Serial Console for Linux", available online at <https://docs.microsoft.com/en-us/azure/virtual-machines/troubleshooting/serial-console-linux>, May 1, 2019, 5 pages.
Microsoft Azure, "Azure Serial Console for Windows", available online at <https://docs.microsoft.com/en-us/azure/Virtual-machines/troubleshooting/serial-console-windows>, May 1, 2019, 7 pages.
Project ACRN, "Developer Guide: Virtio-Console High-Level Design", available online at <https://projectacrn.github.io/0.2/developer-guides/virtio-console.html>, Version 0.2, 2018, 5 pages.

* cited by examiner

VIRTUAL SERIAL PORTS FOR VIRTUAL MACHINES

BACKGROUND

A computer system includes various electronic components, such as a processor, a memory, a persistent storage, a network interface controller, and so forth. Machine-readable instructions, including software programs and/or firmware programs, can be executed on the processor. A user, a program, or an electronic component can perform communications in the computer system using a serial port.

BRIEF DESCRIPTION OF THE DRAWINGS

Some implementations of the present disclosure are described with respect to the following figures.

Figure 1A:
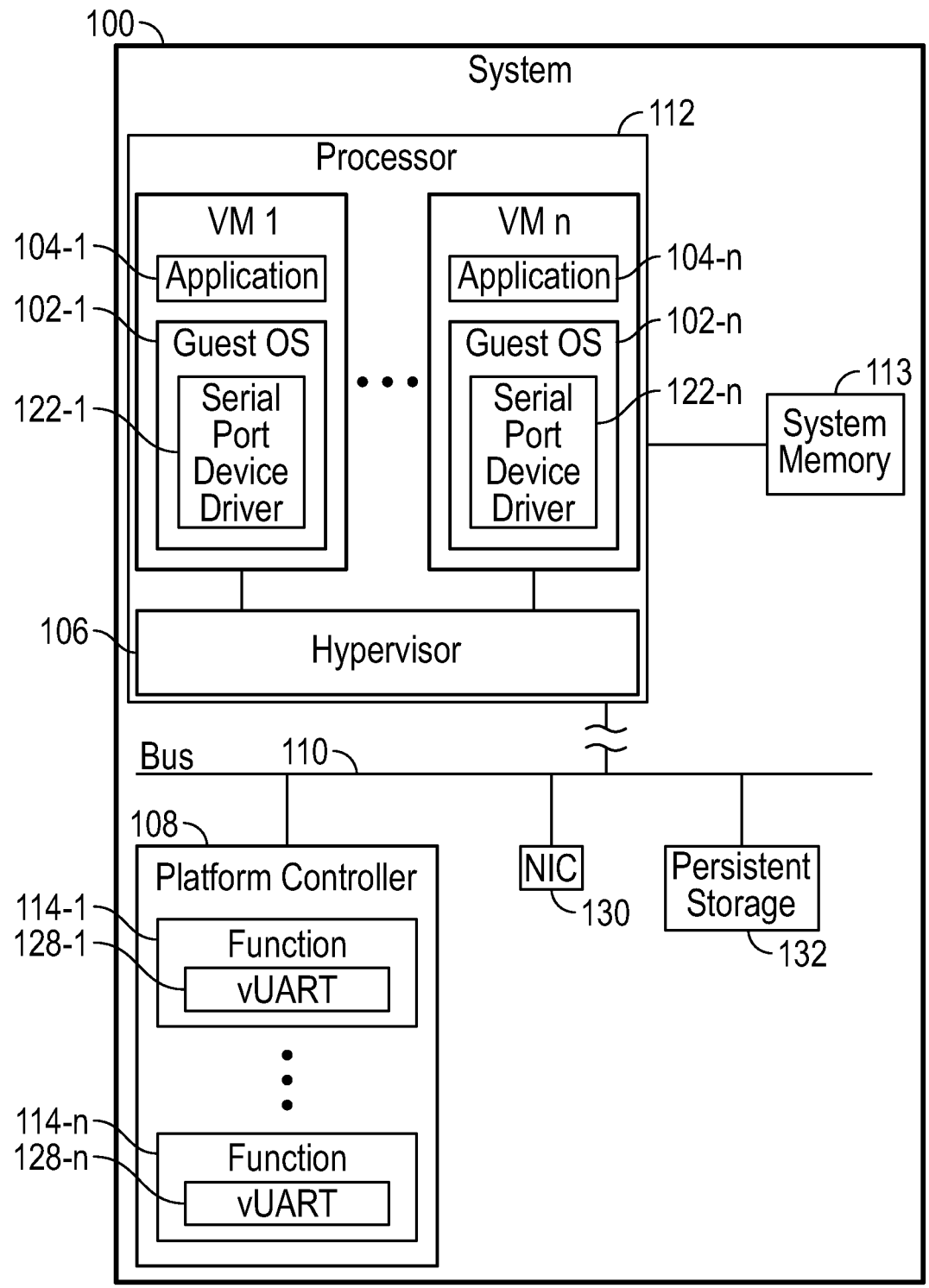
FIG. 1A is a block diagram of a system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of computer systems can include any of the following: a desktop computer, a notebook computer, a tablet computer, a server computer, a smartphone, a wearable device (e.g., a smart watch, smart eyeglasses, a head-mounted device, etc.), a game appliance, an Internet-of-Things (IoT) device, a printing system, a storage appliance, a communication node, and so forth.

A computer system can include a serial port (or multiple serial ports). A "serial port" can refer to a communication interface through which data is communicated as a serial stream (e.g., serial stream of bits). A program or electronic component in the computer system can interact with another entity (e.g., an entity outside the computer system) through the serial port. Examples of programs can include an operating system (OS), an application program, another type of software program, a firmware program, or any other machine-readable instructions.

In some examples, in a bare metal machine, a serial port can include a physical serial port provided by a chipset in the bare metal machine. A bare metal machine can refer to a computer system in which machine-readable instructions can be executed directly on a hardware processor without an intervening virtualization layer. A bare metal machine does not include virtual machines (VMs) (discussed further below).

The physical serial port can include a serial controller and a serial port connector through which the serial controller is able to establish a communication of data in a serial stream. The data may be transmitted by the serial controller to another entity, or the data may be received by the serial controller from another entity.

In other examples of a bare metal machine, a serial port can include a virtual serial port, such as implemented by a baseboard management controller (BMC).

Other types of computer systems may implement virtualization, in which multiple VMs can be executed in a computer system (such VMs are also considered to be hosted by the computer system). The VMs can share the physical resources (e.g., a processor, a memory, a persistent storage, a network interface controller, etc.) of the computer system. A "virtual machine" or "VM" can refer to a partition of a computer system in which machine-readable instructions (e.g., a guest OS, an application program, etc.) can run while being isolated from machine-readable instructions executed in another VM. In some examples, a container can also be considered a VM.

A computer system that implements virtualization can also include a hypervisor, which is also referred to as a virtual machine monitor (VMM). The hypervisor (which includes machine-readable instructions) provides a virtualization layer between the VMs and the underlying hardware. The hypervisor can create VMs that are run in the computer system, and the hypervisor can manage the execution of the VMs and the sharing of computer system physical resources by the VMs. The hypervisor can emulate the physical resources of the computer system such that a VM can access the emulated physical resources, and the hypervisor can provide isolation between VMs.

A program executing in a VM, or a user interacting with the VM, may attempt to perform communications using a serial port. In other examples, a VM in a computer system may receive a communication at a serial port.

In some examples, a hypervisor can emulate serial ports for the VMs in the computer system. The hypervisor prevents different VMs from accessing the same real or virtual serial port, since allowing different VMs to access the same serial port would violate the goal of providing isolation between the different VMs.

The emulation of serial ports by the hypervisor consumes physical resources of the computer system, including processor resources. In a computer system including a large number of VMs, the emulation of serial ports can consume cycles of a processor, which can slow down other operations of the computer system. As another example, a VM infected with malware or a VM that is malfunctioning may perform a large number of data communications through a serial port, which can cause the computer system to slow down if serial port emulation is performed by the hypervisor to handle such data communications.

In accordance with some implementations of the present disclosure, instead of emulating a serial port using a hypervisor to handle serial port communications by or with VMs, serial port emulation can be offloaded to a platform controller that is separate from the hypervisor. A "platform controller" can refer to a controller that performs specified tasks in a computer system. In some examples, the platform controller is a bus device on a bus, such as a Peripheral Component Interconnect (PCI) bus. In other examples, the platform controller can be a bus device connected to another type of bus in a system. A "bus" refers to a communication link over which multiple devices can communicate with one another.

The platform controller is separate from the main processor of the system, where the main processor can execute various machine-readable instructions of the system, such as VMs, an operating system, an application program, firmware (e.g., boot code, hardware initialization code, etc.), and so forth. The platform controller can be designated to perform specified tasks of the system, including emulation of serial ports as well as other tasks (e.g., power management tasks, thermal management tasks, system monitoring tasks, etc.). In some examples, the platform controller can be a separate system-on-chip coupled to the main processor. In more specific examples, the platform controller can be made from a smart network interface controller (NIC), or be part of a BMC. The platform controller can have its own processing circuitry (that is separate from the main processor executing the OS and/or other program code of a computer system) and run its own firmware. A BMC is a specialized service processor that can monitor the physical state of a computer system using sensors and communicates with a management system through an independent out-of-band connection.

The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware level access to hardware components located in the computer system. The BMC may be able to directly modify the hardware components. The BMC may operate independently of the OS of the computer system that the BMC is located in. The BMC may be located on the motherboard or main circuit board of the computer system to be monitored. The fact that a BMC is mounted on a motherboard of the managed computer system or otherwise connected or attached to the managed computer system does not prevent the BMC from being considered separate from a processing resource that executes the OS. A BMC has management capabilities to manage components of the computer system. Examples of management capabilities of the BMC can include any or some combination of the following: power control, thermal monitoring and control, fan control, system health monitoring, remote access of the computer system, remote reboot of the computer system, system setup, OS image deployment and recovery, system security, and so forth.

In some examples, a BMC can provide so-called "lights-out" functionality for computer systems. The lights out functionality may allow a user, such as a systems administrator to perform management operations on the computer system even if an OS is not installed or not functional on the computer system. Moreover, in some examples, the BMC can run on auxiliary power (e.g., battery power or an auxiliary power rail); as a result, the computer system does not have to be powered on to allow the BMC to perform its operations. The services provided by the BMC may be considered "out-of-band" services, since the OS may not be running and in some cases the computer system may be powered off or is not functioning properly (e.g., the computer system has experienced a fault or hardware failure).

The BMC may include a communication interface, such as a network interface, and/or a serial interface that an administrator or other entity can use to remotely communicate with the BMC. An "out-of-band" service can be provided by the BMC via a dedicated management channel (e.g., the communication interface) and is available whether the computer system is in a powered on state. In some examples, the BMC is an example of the platform controller.

The platform controller provides a separate physical processor (separate from the main processor of the system) in which serial port emulation can be provided in a secure manner. For example, the platform controller is protected against attacks which may affect operations of the main processor, such as when malware infects a system and executes on the main processor.

Offloading serial port emulation to the platform controller reduces processor resource consumption overhead by the hypervisor to perform serial port communications of VMs. In some examples, a portion of a PCI memory is assigned to include serial port register sets associated with respective VMs, where each serial port register set includes registers that are accessed when performing serial port communications. Accesses of the registers in the PCI memory portion can be detected by the platform controller.

FIG. 1A is a block diagram of a system 100. The system 100 can include a computer system or multiple computer systems.

The system 100 includes n VMs (VM 1 to VM n depicted in FIG. 1A), where n≥1. VMs can be started on demand by a user or other entity. The system 100 can start with zero VMs, and additional VM(s) is (are) started when requested. Each VM includes a respective guest OS. VM 1 includes a guest OS 102-1, and VM n includes a guest OS 102-$n$. Examples of the guest OSes include a Linux OS, a WINDOWS OS, and/or other types of OSes. The different guest OSes 102-1 to 102-$n$ can be of the same type or of different types. Each VM can also include a respective application program (or multiple application programs) executing in the VM. For example, VM 1 includes an application program 104-1, and VM n includes an application program 104-$n$. Note that prior to the creation of a VM, there is no guest OS 102-$i$ ($i$=1 to n) and no application program 104-$i$.

The system 100 further includes a hypervisor 106 that creates the VMs, manages execution of the VMs, emulates physical resources of the system 100 that are accessible by the VMs, provides isolation between the VMs, and performs other virtualization tasks.

In accordance with some implementations of the present disclosure, instead of emulating a serial port using the hypervisor 106, serial port emulation can be offloaded to a platform controller 108 of the system 100. In some examples, the platform controller 108 is a bus device on a bus 110 of the system 100. For example, the bus 110 can be a PCIe bus. In other examples, the bus 110 can be a different type of bus or other type of communication fabric.

The platform controller 108 can be implemented using any type of hardware processing circuitry, including, as examples, a microcontroller, a programmable integrated circuit device (such as an application specific integrated circuit or ASIC device), a programmable gate array, a microprocessor, or any other type of hardware processing circuit.

In some examples, the platform controller 108 is separate and distinct from a processor (or processors) 112 of the system 100. A processor can include a microprocessor, a core of a multi-core microprocessor, a microcontroller, a programmable integrated circuit, a programmable gate array, a digital signal processor, or another hardware processing circuit.

The processor 112 is coupled to the bus 110, either directly or through another device, such as a bridge device. The processor 112 executes machine-readable instructions of the system 100, including the hypervisor 106 and the VMs, a host OS (if present), as well as other programs (including software programs and/or firmware programs).

The processor 112 can be coupled to a system memory 113, which can include a memory device or multiple memory devices to store data and machine-readable instructions. A memory device can include a volatile memory device such as a dynamic random access memory or DRAM device, a static random access memory or SRAM device, etc.). Alternatively, a memory device can include a nonvolatile memory device. Although not shown, the system memory 113 can include a memory controller, or alternatively, a memory controller is connected to the memory device(s) to control access of data in the memory device(s).

Other devices can also be connected to the bus 110, including a network interface controller (NIC) 130 and a persistent storage 132. The NIC 130 is able to communicate over a network, such that components of the system 100, including the VMs, are able to communicate with other entities over the network through the NIC 130. In some examples, a physical serial port may be connected to the bus 110.

The persistent storage 132 can store data that persists even if power is removed from the system 100 or the persistent storage 132. The persistent storage 132 can be implemented using a nonvolatile storage device (or multiple nonvolatile storage devices). A nonvolatile storage device can include a flash memory device, a disk-based storage device, and so forth.

In examples according to FIG. 1A, serial port emulation can be performed using PCI functions 114-1 to 114-n that are provided by the platform controller 108. The hypervisor 106 can assign a PCI function (or multiple PCI functions) to each VM. The PCI functions 114-1 to 114-n contain respective virtual universal asynchronous receiver-transmitters (vUARTs) 128-1 to 128-n. A UART is a device to transmit and receive serial data. Instead of implementing physical UARTs, vUARTs 128-1 to 128-n contained in the PCI functions 114-1 to 114-n are provided by the platform controller 108.

Figure 1B:
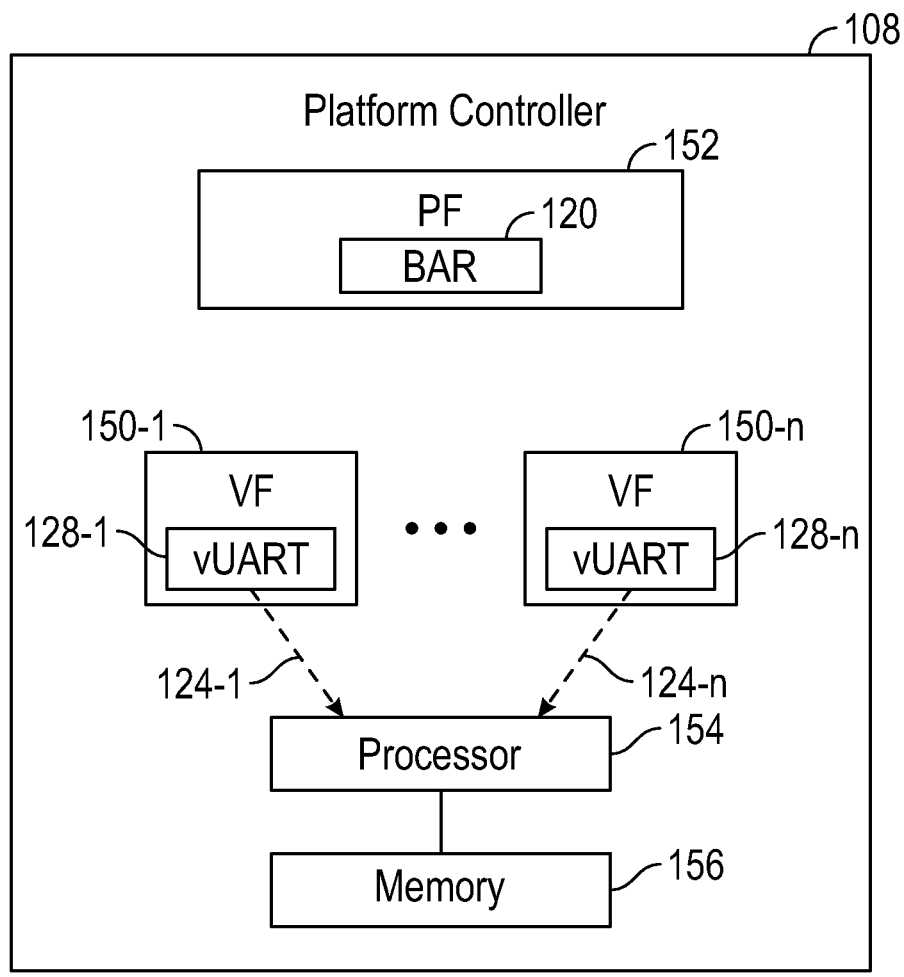
FIG. 1B is a block diagram of a platform controller according to some examples.

FIG. 1B shows further details of the platform controller 108 according to some examples. The platform controller 108 can have other implementations in other examples. In some examples, the PCI functions 114-1 to 114-n of FIG. 1A are implemented as virtual functions (VFs) 150-1 to 150-n (shown in FIG. 1B) that are according to PCIe single root I/O virtualization (SR-IOV), as defined by a PCI Special Interest Group (SIG), which is a community that defines standards (including the SR-IOV Specification) relating to PCIe. Each VF 150-i contains a corresponding vUART 128-i. In the example of FIG. 1B the VF 150-1 is assigned to VM 1, the VF 150-n is assigned to VM n, and so forth. Each VF can support a unique and separate data path for I/O-related functions (e.g., serial port communications) within the PCIe hierarchy. The vUART 128-1 emulates a serial port for VM 1, and the vUART 128-n emulates the serial port for VM n.

In other examples, the PCI functions 114-1 to 114-n of FIG. 1A can be implemented as another type of function.

In further examples, it is possible to assign multiple serial ports per VM. In such examples, there can be multiple VFs (that contain respective vUARTs) assigned to a VM, where the multiple VFs represent different serial ports assigned to the VM.

SR-IOV allows a PCIe device (such as a serial port implemented by the platform controller 108 of FIG. 1B) to present itself to a host (e.g., the system 100) as multiple distinct virtual devices. The PCIe device (e.g., the platform controller 108) implements a PCIe physical function (PF) 152 that is partitioned into multiple VFs (e.g., 150-1 to 150-n shown in FIG. 1B) for the purpose of sharing the PCIe device's resources in a virtual environment.

The PF 152 provides control over the creation and allocation of VFs. The PF 152 contains an SR-IOV capability structure and manages the SR-IOV functionality. The PF 152 can be discovered, managed, and manipulated like any other PCIe device in the system 100 of FIG. 1A.

The VFs 150-1 to 150-n share the platform controller's underlying hardware and PCIe interface to the PCI bus 110.

The platform controller 108 of FIG. 1B further includes a processor 154 and a memory 156. The processor 154 of FIG. 1B is to execute instructions of the platform controller 108 to perform tasks of the platform controller 108.

In accordance with some implementations of the present disclosure, SR-IOV enables serial port activations by VMs to bypass an emulation layer in the hypervisor 106. VFs according to SR-IOV are lightweight so that a large number of VFs can be implemented in the platform controller 108. For example, if the system 100 includes a large number of VMs, a corresponding large number of VFs can be implemented on the platform controller 108 to perform serial port emulation for the respective VMs.

An SR-IOV-capable device (e.g., the platform controller 108) can be configured (such as by the hypervisor 106 or another entity in the system 100) to appear in the PCI memory space as multiple VFs, where each VF has its own PCI memory space. A PCI memory can refer to a portion of memory space in the system 100 that includes structures (e.g., registers) that can be used by an entity (e.g., a VM or any other entity) in the system 100 to interact with a corresponding PCI device, such as any of the VFs 150-1 to 150-n.

In some examples, to perform serial port emulation, each VF 150-1 to 150-n has a class code that represents a serial port controller. According to PCIe, a class code is a three-byte field in a function's configuration space header that identifies a functionality of the function. For example, a class code can include a base class sub-field (one byte in length, for example), a subclass sub-field (one byte in length, for example), and a programming interface sub-field (one byte in length, for example). The base class sub-field broadly classifies the type of functionality that the VF provides. The subclass sub-field more specifically identifies the type of functionality that the VF provides. The programming interface sub-field identifies the specific register-level interface (if any) of a VF, so that a device-independent software (e.g., a VM) can interact with the VF.

In specific examples, a class code value of 07h/00h/02h (e.g., as defined by the PCI Code and ID Assignment Specification as promulgated by PCI-SIG) represents a 16550-compatible serial port controller. In the hypervisor 106, instead of emulating the 16550-compatible serial port controller at specific I/O space addresses, each VM can be assigned its respective VF 150-i (i=1 to n).

The 16550-compatible serial port controller is an example of a serial port controller that has a 16-byte first-in-first-out (FIFO) buffer. In other examples, the VFs 150-1 to 150-n can emulate a different type of serial port controller, such as the 16850-compatible serial port controller that has a 128-byte FIFO buffer. The class code for the 16850-compatible serial port controller is 07h/00h/05h, for example.

Figure 2A:
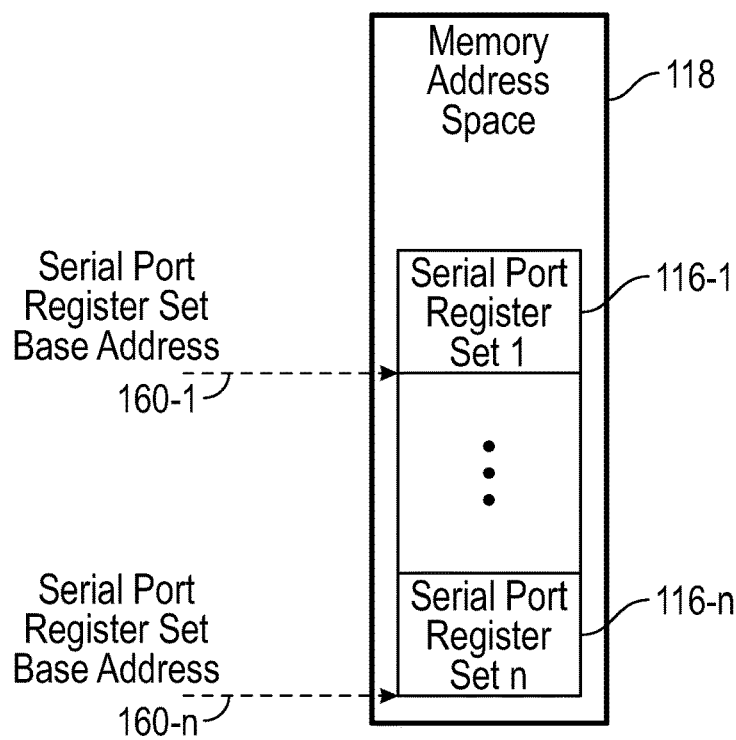
FIGS. 2A-2B are block diagrams of memory address spaces according to some examples.

In some examples, VM i (i=1 to n) can recognize based on the base class sub-field and the subclass sub-field together that a VF 150-i (i=1 to n) is providing the functionality of a serial port controller. The programming interface sub-field can identify a serial port register set (shown as 116-i (i=1 to n) in FIG. 2A) that VM i can interact with (e.g., write a specified value to a register of the serial port register set 116-i to perform serial port communications of VM i). The registers of each serial port register set 116-i are part of a corresponding vUART 128-i. The serial port register set 116-i in the corresponding vUART 128-i is mapped to a memory address space 118, and more specifically, to PCI memory in the memory address space 118. The memory address space 118 can be implemented with a number of storage devices in the system 100, including the system memory 113 of FIG. 1A, registers in the platform controller 108, and so forth. The serial port register sets 116-1 to 116-n include memory-mapped registers that are part of the memory address space 118.

In alternative examples, such as in examples where the functions 114-1 to 114-n are PFs, then the serial port register sets 116-1 to 116-n can be part of an I/O address space.

The registers of each serial port register set 116-i include UART registers that are used for serial port communications. The registers of the serial port register set 116-i can include, as examples, the following: a Transmitter Holding Buffer/Receiver Buffer (to hold transmitted or received data during a serial port communication), a Divisor Latch Bytes register (that holds a value determining a communication data rate), and other registers.

Implementing the serial port register sets 116-1 to 116-n in the memory address space can be more efficient than implementing the serial port register sets in the I/O space (such as in implementations where SR-IOV is not used), since I/O space accesses of registers can slow down operations of the processor 112.

Memory addresses of the memory address space 118 can be mapped to a memory controller and/or a PCIe controller. The memory controller is connected to a memory device (or alternatively, multiple memory devices). A memory device can include a volatile memory device (e.g., a dynamic random access memory or DRAM device, a static random access memory or SRAM device, etc.). Alternatively, a memory device can include a nonvolatile memory device (e.g., a flash memory device, etc.). A PCIe controller is connected to a PCIe device. A PCIe device can support memory accesses, but they may not really access memory devices such as DRAMs or SRAMs. Instead, a PCIe device may access memory-mapped registers that are part of the memory address space 118.

In some examples, the starting address (or base address) of the PCI memory space for each serial port register set 116-i is based on a memory address contained in a PCI base address register (BAR) 120, which is in the PCI configuration space. The PCI BAR 120 is included in the PF 152, as shown in FIG. 1B. PCI defines multiple BARs that can be used to hold various memory addresses for a PCI device or function.

The serial port register set base addresses 160-1 to 160-n of the PCI memory spaces containing the respective serial port register sets 116-1 to 116-n are derived based on the memory address contained in the BAR 120. The hypervisor 106 writes the memory address to the BAR 120. The memory address contained in the BAR 120 defines a chunk of PCI memory space that is to be partitioned evenly across the VFs 150-1 to 150-n. The defined chunk of PCI memory space has a size BARSIZE. Each VF is assigned a portion of the chunk of PCI memory space of size BARSIZE/n. The serial port register set base address 160-i of the PCI memory containing the serial port register set 116-i is computed based on the VF number of VF 150-i in conjunction with the BAR 120.

A serial port device driver (or another program) that is in a VM is able to access the PCI memory space of the corresponding VF. As shown in FIG. 1A, multiple serial port device drivers 122-1 to 122-n are included in respective guest OSes 102-1 to 102-n.

In some examples, a guest OS 102-i in VM i can include an application programming interface (API) that allows the serial port device driver 122-i in VM i to access the PCI memory space of the VF 150-i.

After SR-IOV is enabled in the PF 152 of the platform controller 108, the VF instances 150-i are available for enumeration by configuration software running on the processor 112 and can be accessed by bus, device and function. The configuration software, which in some examples is the hypervisor 106, can then configure the desired number of VF instances 150-i from those supported by the PF 152 and assign resources accordingly (i.e., assign a portion of the memory space 118 for the VF instances 150-i by programming the BAR 120). Once complete, the serial port register sets 116-i are addressable by the processor 112

The serial port device driver 122-i in the guest OS 102-i is able to query the hypervisor 106 to obtain the corresponding serial port register set base address 160-i being accessed by the serial port device driver 122-i. This allows the serial port device driver 122-i in the guest OS 102-i to perform serial port communications using the serial port register set 116-i.

In examples where the guest OS 102-i is unable to automatically detect PCI serial ports (e.g., the guest OS 102-i is unable to recognize the base class/subclass/programming interface values for a serial port controller discussed above), the address for the serial port can be provided to the guest OS 102-i in a different way. An example of a guest OS that is unable to automatically detect PCI serial ports is the LINUX OS. In some examples, the address for the serial port can be provided to such guest OS 102-i by including the address in a kernel command line used to launch the guest OS 102-i. In other examples, other ways of providing the address for the serial port to the guest OS 102-i can be used.

Each vUART 128-i can include a serial port write detection logic and/or a serial port read detection logic. The serial port write detection logic is able to detect writes by VMs or other entities (whether internal or external of the system 100) to the serial port register sets 116-1 to 116-n of the respective vUARTs 128-1 to 128-n. Writes of registers of the serial port register sets 116-1 to 116-n can be performed as part of serial port communications. The serial port read detection logic is able to detect reads by VMs or other entities of the serial port register sets 116-1 to 116-n.

Writes and reads are directed to a respective vUART 128-i. In response to a write or read, the serial port write or read detection logic in the vUART 128-i can signal an interrupt to the processor 154 (FIG. 1B) inside the platform controller 108, such as using a respective serial port indication 124-i. The serial port indication 124-i can indicate which of the registers of the serial port register set 116-i has been written to or read from. The serial port indication 124-i can include a signal, an interrupt, a command, or any other indication relating to serial port communications or operations. The serial port indication 124-i can include information that identifies which VF 150-*i* the serial port indication 124-*i* is associated with, and which register was written to.

In response to the serial port indication 124-*i*, machine-readable instructions (e.g., firmware) running on the processor 154 can redirect the UART traffic or synthesize a proper response. In other examples, the vUART 128-*i* contains hardware that moves the data or synthesizes a response under the orchestration of machine-readable instructions (e.g., firmware) running on the processor 154. For example, data transmitted from the serial port device driver 122-*i* may be intercepted by the vUART 128-*i* and placed directly into a circular buffer (or other storage structure) associated with VM i.

Figure 2B:
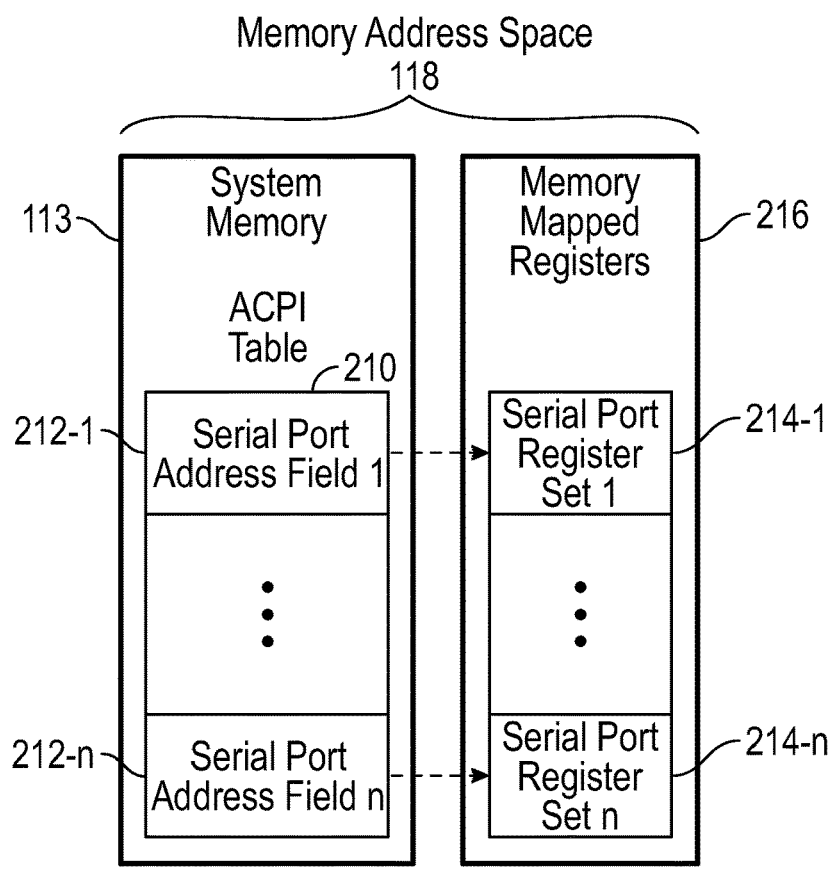

In other examples, instead of providing VFs in a platform controller for emulating serial ports, an Advanced Configuration and Power Interface (ACPI) table 210, as shown in FIG. 2B, is used for storing serial port address information in accordance with further implementations of the present disclosure. In some examples, the ACPI table 210 is a Fixed ACPI Description Table (FADT). The FADT includes various configuration details related to registers.

The ACPI table 210 is part of the memory address space 118 contained in the system memory 113. In accordance with some implementations of the present disclosure, the ACPI table 210 contains multiple serial port address fields 212-1 to 212-*n* that are associated with respective VMs 1 to n. The serial port address field 212-1 includes an address of a memory location that contains a serial port register set 214-1 for corresponding VM 1, the serial port address field 212-*n* contains an address of the memory location that contains a serial port register set 214-*n* for corresponding VM n, and so forth. The serial port register sets 214-1 to 214-*n* are similar to the serial port register sets 116-1 to 116-*n* of FIG. 2A, and can include registers of vUARTs 128-1 to 128-*n*, respectively, such as shown in FIG. 1A. The serial port register sets 214-1 to 214-*n* include memory-mapped registers (identified as region 216) that are part of the memory address space 118.

The starting address of the region 216 can be indicated by an address contained in a BAR (not shown), for example.

In some examples, the addresses of the serial port register sets 214-1 to 214-*n* can be assigned by the hypervisor 106 (FIG. 1A). The hypervisor 106 can write the serial port addresses to the corresponding serial port address fields 212-1 to 212-*n* of the ACPI table sections.

In other examples, the addresses of the serial port register sets 214-1 to 214-*n* can be assigned by another entity (e.g., a host OS or a basic input/output system (BIOS)).

Figure 3:
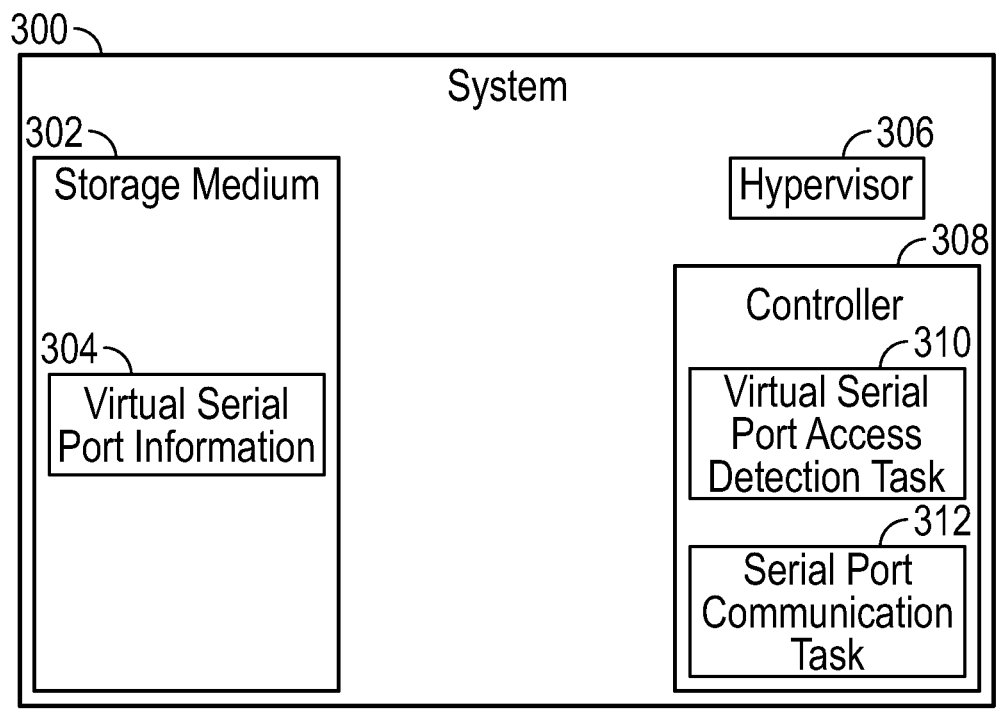
FIG. 3 is a block diagram of a system according to further examples.

FIG. 3 is a block diagram of a system 300 according to further examples. The system 300 includes a storage medium 302 to store virtual serial port information 304 indicating address locations of virtual serial ports. The virtual serial ports are associated with respective VMs.

The virtual serial port information 304 can include the addresses of the serial port register sets 116-1 to 116-*n* (FIG. 2A), which can be derived from a memory address in a BAR (e.g., 120 in FIG. 1B) or in other locations. In the example of FIG. 2B, the virtual serial port information 304 can include addresses in the ACPI table serial port address fields 212-1 to 212-*n*, where such addresses refer to serial port register sets 214-1 to 214-*n* in FIG. 2B. The serial port register sets 116-1 to 116-*n* or 214-1 to 214-*n* can be part of a memory address space or an I/O address space.

The system 300 includes a hypervisor 306, and a controller 308 (e.g., platform controller 108) that is separate from the hypervisor 306 to perform various tasks. The tasks of the controller 308 include a virtual serial port access detection task 310 to detect, based on the virtual serial port information 304, an access of a first virtual serial port associated with a first VM.

The tasks further include a serial port communication task 312 to communicate data between the first VM and another entity through the first virtual serial port.

In some examples, the detection of the access of the first virtual serial port comprises a detection of a write to a register associated with the first virtual serial port.

In some examples, the virtual serial ports are associated with respective VFs assigned to the respective VMs, where the VFs implemented on the controller. The VFs can correspond to virtual serial port controllers (e.g., vUARTs 128-1 to 128-*n* shown in FIGS. 1A and 1B) that control communications of the virtual serial ports. In some examples, the VFs are configurable to different types of virtual serial port controllers associated with FIFO buffers of different sizes.

Figure 4:
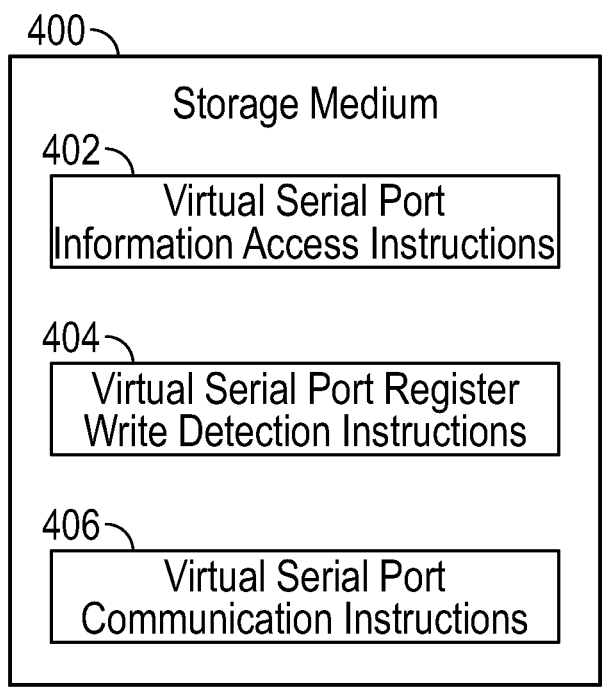
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a controller to perform specified tasks.

The machine-readable instructions include virtual serial port information access instructions 402 to access information indicating address locations of register sets of virtual serial ports, where the virtual serial ports are associated with respective VMs.

The machine-readable instructions further include virtual serial port register write detection instructions 404 to detect, based on the information, a write of a register in a register set of the virtual serial port associated with a first VM.

The machine-readable instructions further include virtual serial port communication instructions 406 to, in response to the detecting, communicate data between the first VM and another entity through the virtual serial port associated with the first VM, without performing serial port emulation by a hypervisor.

Figure 5:
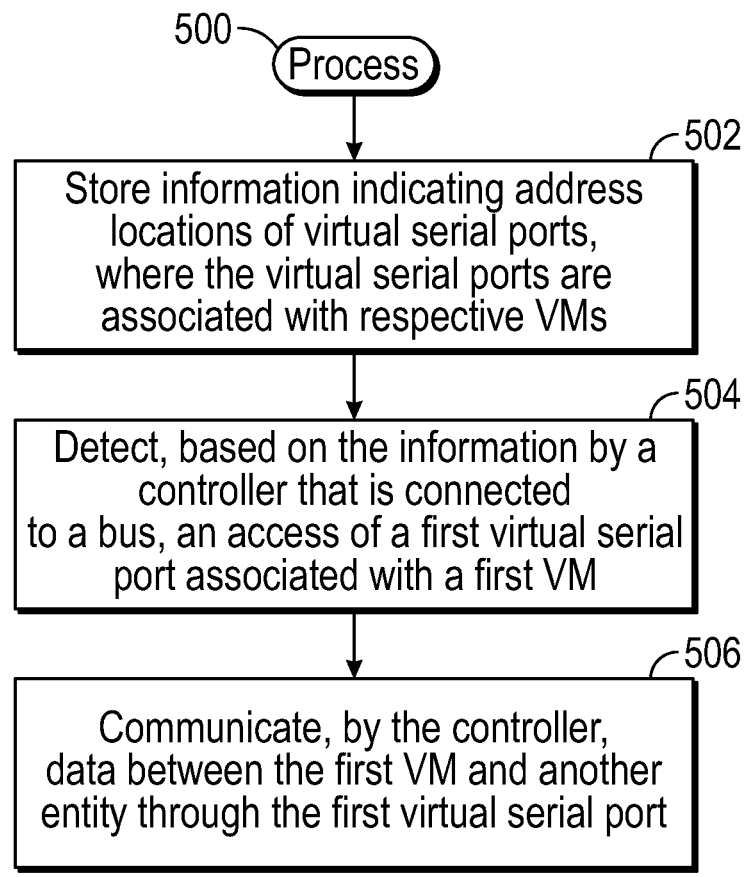
FIG. 5 is a flow diagram of a process according to some examples.

FIG. 5 is a flow diagram of an example process 500 according to some examples.

The process 500 includes storing (at 502) information indicating address locations of virtual serial ports, where the virtual serial ports are associated with respective VMs.

The process 500 further includes detecting (at 504), based on the information by a controller that is connected to a bus, an access of a first virtual serial port associated with a first VM.

The process 500 further includes communicating (at 506), by the controller, data between the first VM and another entity through the first virtual serial port.

The storage medium 400 of FIG. 4 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a storage medium to store information indicating address locations of virtual serial ports, wherein the virtual serial ports are associated with respective virtual machines (VMs) of a plurality of VMs;
a hypervisor; and
a controller that is separate from the hypervisor, the controller to:
provide virtual functions (VFs) assigned to the respective VMs, wherein the virtual serial ports are associated with the VFs, and the VFs correspond to virtual serial port controllers that control communications of the virtual serial ports, and wherein the VFs are configurable to different types of virtual serial port controllers associated with first-in-first-out (FIFO) buffers of different sizes,
detect, based on the information, an access of a first virtual serial port associated with a first VM of the plurality of VMs, and
communicate data between the first VM and another entity through the first virtual serial port.

2. The system of claim 1, wherein the detection of the access of the first virtual serial port comprises a detection of a write to a register associated with the first virtual serial port.

3. The system of claim 2, wherein the information indicates the address locations of respective register sets of the virtual serial ports.

4. The system of claim 3, wherein the respective register sets are in an input/output (I/O) address space.

5. The system of claim 3, wherein the respective register sets are in a memory address space.

6. The system of claim 1, wherein the information comprises a base address register (BAR) containing a memory address for deriving addresses for the virtual serial ports.

7. The system of claim 1, wherein the information comprises Advanced Configuration and Power Interface (ACPI) information.

8. The system of claim 1, wherein the controller is a baseboard management controller.

9. The system of claim 1, wherein the virtual serial port controllers comprise virtual universal asynchronous receiver-transmitters (vUARTs).

10. The system of claim 1, wherein each VF of the VFs has a base class/subclass/programming interface set to a serial port controller.

11. The system of claim 1, wherein the hypervisor is to assign the VFs to the respective VMs.

12. The system of claim 1, wherein the hypervisor is to associate multiple virtual serial ports with a given VM of the plurality of VMs.

13. The system of claim 1, wherein the information is based on input from a kernel command line of a guest operating system of a VM of the plurality of VMs.

14. The system of claim 1, further comprising a bus, the controller comprising a bus device connected to the bus.

15. A non-transitory machine-readable storage medium comprising instructions that upon execution cause a controller to:
access information indicating address locations of register sets of virtual serial ports, wherein the virtual serial ports are associated with respective virtual machines (VMs) of a plurality of VMs, wherein the register sets are associated with respective virtual functions (VFs) provided by the controller, and wherein each VF of the VFs has a base class/subclass/programming interface set to a serial port controller;
detect, based on the information, a write of a register in a register set of the virtual serial port associated with a first VM of the plurality of VMs; and
in response to the detecting, communicate data between the first VM and another entity through the virtual serial port associated with the first VM, without performing serial port emulation by a hypervisor.

16. A method comprising:
storing information indicating address locations of virtual serial ports, wherein the virtual serial ports are associated with respective virtual machines (VMs) of a plurality of VMs;
providing, by a controller, virtual functions (VFs) assigned to the respective VMs, wherein the virtual serial ports are associated with the VFs, and the VFs correspond to virtual serial port controllers that control communications of the virtual serial ports, and wherein the VFs are configurable to different types of virtual serial port controllers associated with first-in-first-out (FIFO) buffers of different sizes;
detecting, based on the information by the controller, an access of a first virtual serial port associated with a first VM of the plurality of VMs; and
communicating, by the controller, data between the first VM and another entity through the first virtual serial port.

17. The method of claim 16, wherein the information indicates addresses of respective register sets of the virtual serial ports.

18. The non-transitory machine-readable storage medium of claim 15, wherein the information comprises a memory address in a base address register (BAR), the memory address in the BAR useable to derive addresses of the register sets.

19. The non-transitory machine-readable storage medium of claim 15, wherein the VFs are configurable to different types of virtual serial port controllers associated with first-in-first-out (FIFO) buffers of different sizes.

20. The method of claim 16, wherein each VF of the VFs has a base class/subclass/programming interface set to a serial port controller.

* * * * *